(12) United States Patent
Kurt et al.

(10) Patent No.: US 12,485,047 B2
(45) Date of Patent: Dec. 2, 2025

(54) REUSABLE UNDERWEAR WITH A REFILLABLE LINER

(71) Applicant: Medline Industries, Inc., Northfield, IL (US)

(72) Inventors: Alyssa Kurt, Trevor, WI (US); Kristy Matus, Grayslake, IL (US); Joseph Stehlik, Chicago, IL (US); Allee Peterson, Chicago, IL (US)

(73) Assignee: Medline Industries, LP, Northfield, IL (US)

( * ) Notice: Subject to any disclaimer, the term of this patent is extended or adjusted under 35 U.S.C. 154(b) by 1270 days.

(21) Appl. No.: 17/032,200

(22) Filed: Sep. 25, 2020

(65) Prior Publication Data

US 2022/0096286 A1    Mar. 31, 2022

(51) Int. Cl.
*A61F 13/505* (2006.01)
*A61F 13/62* (2006.01)
*A61F 13/66* (2006.01)
*A61F 13/74* (2006.01)
(Continued)

(52) U.S. Cl.
CPC .......... *A61F 13/622* (2013.01); *A61F 13/505* (2013.01); *A61F 13/665* (2013.01); *A61F 13/74* (2013.01); *A61F 2013/5683* (2013.01)

(58) Field of Classification Search
CPC .......... A61F 13/15; A61F 13/47; A61F 13/53; A61F 13/51; A61F 13/15203; A61F 13/5323; A61F 13/534; A61F 13/535; A61F 13/539; A61F 2013/530481; A61F 13/15268; A61F 13/493; A61F 13/505; A61F 13/66; A61F 13/665; A61F 13/74; A61F 13/76; A61F 13/80; A61F 2013/15279; A61F 2013/5055; C08L 77/00; A01K 23/00; A47L 13/17
See application file for complete search history.

(56) References Cited

U.S. PATENT DOCUMENTS 2,252,019 A * 8/1941 Meinecke .............. A61F 13/72
604/397
2,890,701 A * 6/1959 Weinman .............. A61F 13/76
604/394
(Continued)

FOREIGN PATENT DOCUMENTS

JP   2016063974 A   4/2016
JP   2016082970 A   5/2016
(Continued)

OTHER PUBLICATIONS

International Search Report; International Patent Application No. PCT/US2021/051112; Medline Industries, Inc.; Jan. 17, 2022.
(Continued)

*Primary Examiner* — Catharine L Anderson
(74) *Attorney, Agent, or Firm* — SandBright, PLLC; Robert D. Spendlove

(57) ABSTRACT

A launderable absorbent article, including a chassis having a front portion, a rear portion, a crotch portion extending longitudinally between the front portion and the rear portion wherein at least a portion of the chassis may receive removably attachable disposable liners to absorb body discharges. The launderable absorbent article is presented in an underwear style to the user.

16 Claims, 14 Drawing Sheets

(51) Int. Cl.
    *A61F 13/76*     (2006.01)
    *A61F 13/56*     (2006.01)

(56) References Cited

U.S. PATENT DOCUMENTS

| | | | |
|---|---|---|---|
| 3,704,710 A * | 12/1972 | Fifer | A61F 13/72 |
| | | | 604/398 |
| 4,813,950 A | 3/1989 | Branch | |
| 4,928,323 A * | 5/1990 | Nathan | A61F 13/76 |
| | | | 2/400 |
| 4,981,480 A | 1/1991 | Gaudet et al. | |
| 5,098,419 A | 3/1992 | Gold | |
| 5,562,648 A | 10/1996 | Peterson | |
| 5,593,398 A | 1/1997 | Weimer | |
| 5,827,261 A * | 10/1998 | Osborn, III | A61F 13/47272 |
| | | | 604/397 |
| 6,702,798 B2 | 3/2004 | Christoffel et al. | |
| 6,797,856 B1 | 9/2004 | Kolb et al. | |
| 6,835,865 B2 | 12/2004 | Quincy, III | |
| 6,979,380 B2 | 12/2005 | Thorson et al. | |
| 7,000,260 B2 | 2/2006 | Rajala et al. | |
| 7,166,095 B1 * | 1/2007 | Coates | A61F 13/505 |
| | | | 604/401 |
| 7,419,562 B2 | 9/2008 | Van Gompel et al. | |
| 7,482,505 B2 | 1/2009 | Stupperich et al. | |
| 7,604,624 B2 | 10/2009 | Veith et al. | |
| 7,621,900 B2 | 11/2009 | Van Gompel et al. | |
| 7,699,825 B2 | 4/2010 | Nakagawa et al. | |
| 7,744,579 B2 | 6/2010 | Langdon et al. | |
| 7,749,211 B2 | 7/2010 | Van Gompel et al. | |
| 7,754,040 B2 | 7/2010 | Norrby | |
| 7,785,307 B2 | 8/2010 | Wennerback | |
| 7,806,880 B2 | 10/2010 | Roe et al. | |
| 7,851,669 B2 | 12/2010 | Nakagawa et al. | |
| 7,887,526 B2 | 2/2011 | Van Gompel et al. | |
| 7,918,959 B2 | 4/2011 | Hornung et al. | |
| 7,993,320 B2 | 8/2011 | Hornung et al. | |
| 8,016,806 B2 | 9/2011 | Hornung et al. | |
| 8,025,652 B2 | 9/2011 | Hornung et al. | |
| 8,029,631 B2 | 10/2011 | Cartier et al. | |
| 8,029,634 B2 | 10/2011 | Widlund et al. | |
| 8,038,662 B2 | 10/2011 | Hornung et al. | |
| 8,083,724 B2 | 12/2011 | Bittner et al. | |
| 8,100,173 B2 | 1/2012 | Hornung et al. | |
| 8,147,476 B2 | 4/2012 | Veith et al. | |
| 8,206,365 B2 | 6/2012 | Norrby | |
| 8,303,562 B2 | 11/2012 | Hornung et al. | |
| 8,476,483 B2 | 7/2013 | Yoshimasa et al. | |
| 8,545,654 B2 | 10/2013 | Lakso et al. | |
| 8,664,469 B2 | 3/2014 | Veith et al. | |
| 8,721,610 B2 | 5/2014 | Langdon et al. | |
| 8,870,732 B2 | 10/2014 | Schneider et al. | |
| 8,932,273 B2 * | 1/2015 | Roe | A61F 13/5638 |
| | | | 604/385.28 |
| 9,017,241 B2 | 4/2015 | Lavon et al. | |
| 9,060,902 B2 | 6/2015 | Gabrielii et al. | |
| 9,144,522 B2 | 9/2015 | Ostertag | |
| 9,199,410 B2 | 12/2015 | Floberg et al. | |
| 9,271,880 B2 | 3/2016 | Karlson et al. | |
| 9,433,539 B2 | 9/2016 | Veith et al. | |
| 9,456,934 B2 | 10/2016 | Lakso | |
| D800,300 S | 10/2017 | Yamada | |
| D805,191 S | 12/2017 | Yamada | |
| D805,635 S | 12/2017 | Yamada | |
| 9,844,478 B2 | 12/2017 | Roe et al. | |
| D806,867 S | 1/2018 | Yamada | |
| 9,872,800 B2 * | 1/2018 | Coates | A61F 13/622 |
| 9,980,861 B2 | 5/2018 | Deerin | |
| 10,117,787 B2 | 11/2018 | Lavon et al. | |
| D834,785 S | 12/2018 | Yamada | |
| 10,327,962 B2 * | 6/2019 | Bryan | A61F 13/49413 |
| 10,391,003 B2 | 8/2019 | Yamada | |
| D865,162 S | 10/2019 | Yamada | |
| D865,516 S | 11/2019 | Zhong et al. | |
| 10,463,546 B2 | 11/2019 | Yamada | |
| 10,610,420 B2 | 4/2020 | Morimoto et al. | |
| 2008/0065039 A1 * | 3/2008 | Labit | A61F 13/5633 |
| | | | 604/385.15 |
| 2008/0200890 A1 | 8/2008 | Wood et al. | |
| 2009/0105676 A1 | 4/2009 | Brusk et al. | |
| 2012/0010585 A1 | 1/2012 | Labit et al. | |
| 2014/0018763 A1 | 1/2014 | Evenson et al. | |
| 2014/0221954 A1 | 8/2014 | Wang et al. | |
| 2016/0347030 A1 | 12/2016 | Yamada | |

FOREIGN PATENT DOCUMENTS

| | | | |
|---|---|---|---|
| JP | 2016083301 A | 5/2016 | |
| JP | 2018109241 A | 7/2018 | |

OTHER PUBLICATIONS

Written Opinion of the International Searching Authority; International Patent Application No. PCT/US2021/051112; Medline Industries, Inc.; Jan. 17, 2022.

* cited by examiner

REUSABLE UNDERWEAR WITH A REFILLABLE LINER

FIELD OF THE INVENTION

Embodiments of the present invention relate primarily to absorbent articles such as reusable incontinence articles, namely, launderable protective underwear that may receive different sizes of removably attachable disposable liners.

BACKGROUND OF THE INVENTION

Absorbent articles are known in the prior art and have many uses. Whether intended for infants, children, adults or the elderly, disposable pads, napkins, diapers, training pants, briefs, underwear, incontinence articles, and the like are intended to absorb and retain body discharges. As used herein, "absorbent article" will refer to all these examples.

Conventional diaper style absorbent articles typically include a front waist portion and a back waist portion which are releasably connected about the hips of the wearer during use by conventional fasteners such as adhesive tape fasteners or hook and loop type fasteners, et al. For example, the conventional fasteners typically include a pair of fasteners, located on the outermost corners of the diaper in the back waist region of the diaper and complimentary fasteners located on the front waist region.

In such a configuration, the diaper is positioned between the legs of the wearer and the fasteners are releasably attached to secure the diaper around the waist of the wearer. Such conventional diapers are easy to fasten and remove from the wearer after use. However, such conventional diapers are not provided in a pre-fastened configuration or single unit, similar to cloth undergarments, and, thus, are not configured to be pulled up or down over the hips of the wearer when the fasteners are attached. Additionally, conventional diapers may be limited to a one time use after biomatter penetrates the absorbent core of the diaper, which may become expensive for the wearer.

Active adults may appreciate the freedom afforded to them by incontinence absorbent articles. Such articles can alleviate some of the emotional and physical discomfort of incontinence by absorbing and containing biomatter. Absorbent articles having the look and feel of traditional undergarments as opposed to diapers with side fastening systems may be desirable by active adult users because such underwear/brief style absorbent articles may be pulled up or down over the hips of a wearer in the same manner as a traditional undergarment.

Similarly, underwear style undergarments typically do not have the same bulk as traditional diaper style absorbent articles. Underwear style absorbent articles often are designed to closely conform to the body of the wearer and consequently have a discreet profile under a wearer's clothing, which renders the absorbent article unnoticeable to the casual observer.

Such underwear style absorbent articles are typically manufactured to include a plurality of side panels to connect the front portion left and right sides with the rear portion left and right sides. Such articles are typically manufactured in a pre-joined configuration, with side seams extending either toward the wearer (on an inside surface of the assembled article) or away from the wear (on an outside surface of the assembled article). Side seams are typically welded, bonded or adhered together and are therefore not adjustable. Further, side seams may not be designed to withstand repeated pulling up and down over a wearer's buttocks and hips without resulting inside seam failure. Other underwear style absorbent articles may include both side seams and secondary mechanical fasteners, for example hook and loop or releasable adhesive tape fasteners. Moreover, other underwear style absorbent articles may not have side seams and may only rely on elastic properties to maintain the correct position on a wearer, more similar to traditional undergarments.

To doff a used underwear style absorbent article, a user can optionally remove shoes and lower garments and pull the absorbent article down over hips and buttocks to facilitate removal. In a public restroom setting or other settings, a user's clothing and stocking or bare feet can come into contact with a restroom floor, which can be both unpleasant and unsanitary. Still further, a user must expend considerable time doffing and donning clothing. To facilitate donning a new brief style absorbent article a user must still doff shoes and clothing.

Underwear style absorbent articles often include an elasticized waist opening that when elongated expands to fit over the user's buttocks and hips. Accordingly, the act of doffing and donning brief style absorbent articles requires a user to stretch open the elastic waist opening, lift their feet and legs within an awkward, confined restroom stall space—without losing balance or falling—and inserting or withdrawing feet and legs into or from not only the elasticized waist opening, but also elasticized leg openings without touching any unpleasant or unsanitary surfaces within the stall. When performed by a person with diminished agility or flexibility of movement can lead to a risk of falls or injury.

As previously addressed, many of the underwear style absorbent articles are limited to a one time use and a specific use. In other words, typical underwear style absorbent articles are disposed of after a single use, and they are created for a certain use, such as an underwear for overnight use. Often, these limitations require a wearer to continually replace the entire underwear style absorbent article once used and to choose the correct type of brief so as to not inundate it with biomatter.

Accordingly, there is a need for an underwear style absorbent article that can be donned and doffed like traditional undergarments while also having the capability of receiving disposable liners that can be applied or removed without removal of a user's lower clothing from about the ankles and feet. Advantages of such absorbent articles may include allowing the user to reduce the risk of falls or injury and to apply numerous sizes of disposable liners to fit their specific needs.

It is further contemplated that in accordance with embodiments of the present invention, an underwear style absorbent article is provided with the ability to receive disposable liners which may be removably attachable.

In embodiments of the present invention, the underwear style absorbent article may be laundered and, thus, repeatedly used, thereby reducing cost for the user and impact on the environment.

BRIEF DESCRIPTION OF THE DRAWINGS

The various aspects, features and advantages of the disclosure will become more fully apparent to those having ordinary skill in the art upon careful consideration of the following Detailed Description thereof with the accompanying drawings described below.

Figure 1:
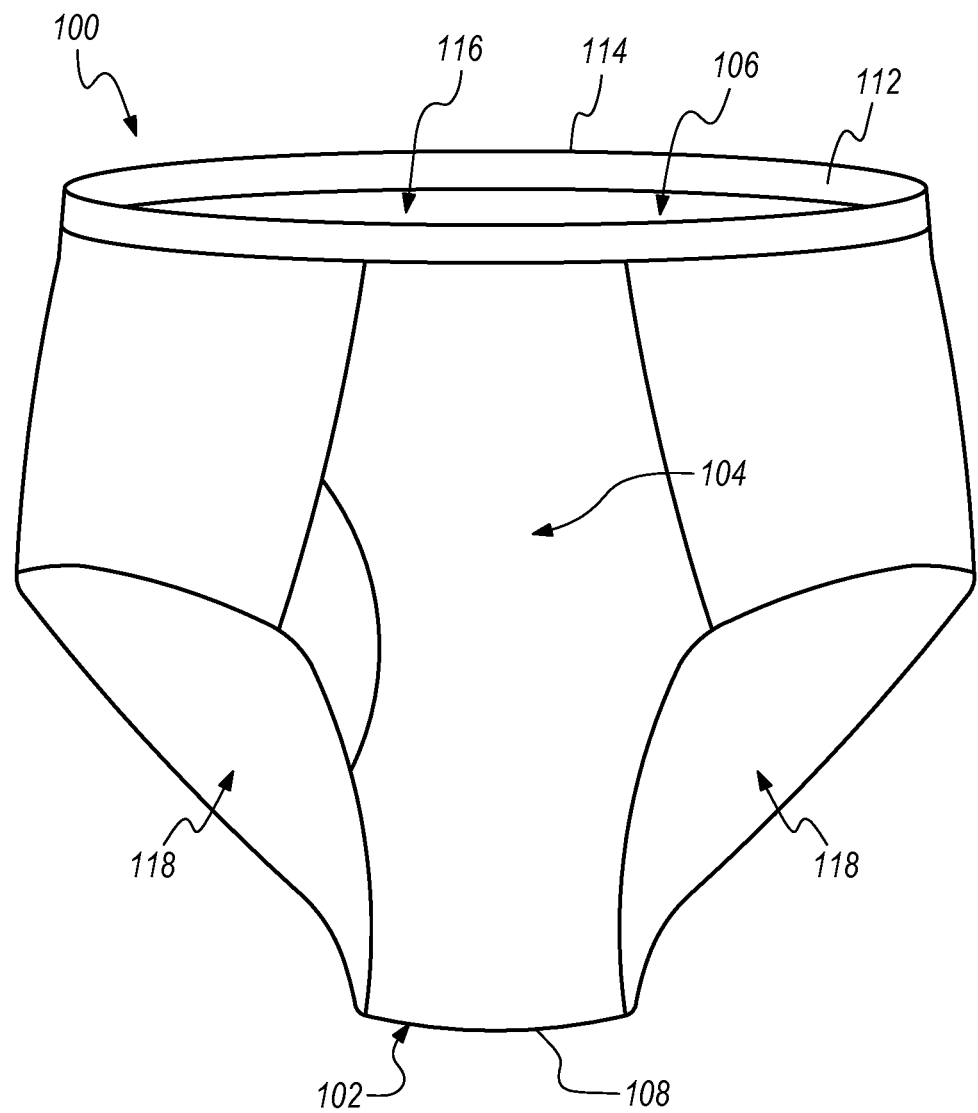
FIG. 1 is a top, front perspective view of an underwear style absorbent article.

While embodiments of the invention are susceptible to various modifications and alternative forms, specific embodiments have been shown by way of example in the drawings and will be described in detail herein. It should be understood however, that the invention is not intended to be limited to the particular forms disclosed. Rather, the invention will cover all modifications, equivalents, and alternatives falling within the spirit and scope of the invention.

DETAILED DESCRIPTION

Embodiments of the invention are now described in detail. Referring to the drawings, like numbers indicate like parts throughout the views. As used in the description herein and throughout the claims, the following terms take the meanings explicitly associated herein, unless the context clearly indicates otherwise: the meaning of "a," "an," and "the" includes plural reference, the meaning of "in" includes "in" and "on." Relational terms such as first and second, top and bottom, left and right and the like may be used solely to distinguish one entity or action from another entity or action without necessarily requiring or implying any actual such relationship or order between such entities or actions.

As used herein, the following terms have the following meanings:

"Attach" and its derivatives refer to the joining, adhering, connecting, bonding, sewing together, or the like, of two elements. Two elements will be considered to be attached together when they are integral with one another or attached directly to one another or indirectly to one another, such as when each is directly attached to intermediate elements. "Attach" and its derivatives include permanent, releasable, or refastenable attachment. In addition, the attachment can be completed either during the manufacturing process or by the end user.

"Bond" and its derivatives refer to the joining, adhering, connecting, attaching, sewing together, or the like, of two elements. Two elements will be considered to be bonded together when they are bonded directly to one another or indirectly to one another, such as when each is directly bonded to intermediate elements. "Bond" and its derivatives include permanent, releasable, or refastenable bonding.

"Cohesive material" refers to a material which demonstrates surface interaction (in terms of connection of one surface to another) when applied to a specially selected material. Cohesive material will fasten or form a connection primarily to itself or to similarly structured materials. Generally, such materials are substantially non-tacky (such as to skin) at room temperature even under some pressure. For purposes of the present specification, the term cohesive will include materials which are sometimes referred to as "selectively adhesive" or "selective adhesive" materials. Materials which are designed to receive (i.e. allow the surface interaction) with a particular cohesive material, but which themselves will not connect with any other materials (or itself) are still considered "cohesive materials" within the meaning of this specification when they act as the target surface for a specific cohesive engaging material. Because the cohesive material will connect or fasten to selective materials and not to other materials generally, this allows for disposition of cohesive polymers onto multiple surfaces of a target material. By contrast, most mechanical fastening systems (such as hook and loop systems) require that the complimentary components be mated in only one relationship to work properly. Cohesive materials may be a bandage type cohesive material or other appropriate cohesive materials.

"Connect" and its derivatives refer to the joining, adhering, bonding, attaching, sewing together, or the like, of two elements. Two elements will be considered to be connected together when they are connected directly to one another or indirectly to one another, such as when each is directly connected to intermediate elements. "Connect" and its derivatives include permanent, releasable, or refastenable connection. In addition, the connecting can be completed either during the manufacturing process or by the end user.

"Integral" is used to refer to various portions of a single unitary element rather than separate structures bonded to or placed with or placed near one another.

"Extensible" refers to materials which elongate or increase in at least one dimension when subject to an external pulling force.

"Elastic," "elasticized" and "elasticity" mean that property of a material or composite by virtue of which it tends to recover its original size and shape after removal of a force causing a deformation.

"Elastomeric" refers to a material or composite which can be elongated by a percent of its relaxed length and which will recover, upon release of the applied force by a percent of its elongation. In certain embodiments, an elastomeric material or composite may be capable of being elongated by at least 100 percent, in further embodiments by at least 300 percent of its relaxed length. Embodiments of the elastic material or composite may recover, upon release of an applied force, at least 50 percent of its elongation.

As used herein the term "refastenable" refers to the attachment of two or more elements or portions of elements together in a manner in which they can be separated and re-attached successively without substantial degradation of fastener performance or damage to surrounding components of the article which would impair its continued use. It will be appreciated that a refastenable component need not have an infinite life span, but it is sufficient that the components attached in a refastenable manner can be separated and re-attached successively several times over the typical use life span of the article.

"Stretchable" or "elastic" are intended to be interchangeable and refer to materials which are extensible, and which also return to substantially their original dimensions when the external pulling force is removed. It will be appreciated that the terms stretchable and elastic include the term extensible as each term is used herein.

These terms may be defined with additional language elsewhere in the specification.

Absorbent articles as described herein generally may include a removably attachable disposable liner having a moisture-pervious inner layer, an absorbent layer, and a liquid-impervious outer layer. Although the remainder of the description will be specifically directed to adult incontinence articles, including launderable briefs and underwear (whether intended for men or women), which may be used interchangeably herein, it is understood that the embodiments may also be implemented on other absorbent articles, whether intended for infants, children, adults or the elderly. As would be understood by one of ordinary skill in the art, such non-limiting examples include: feminine hygiene articles, diapers, training pants, and the like which are intended to absorb and retain body discharges.

Figure 2:
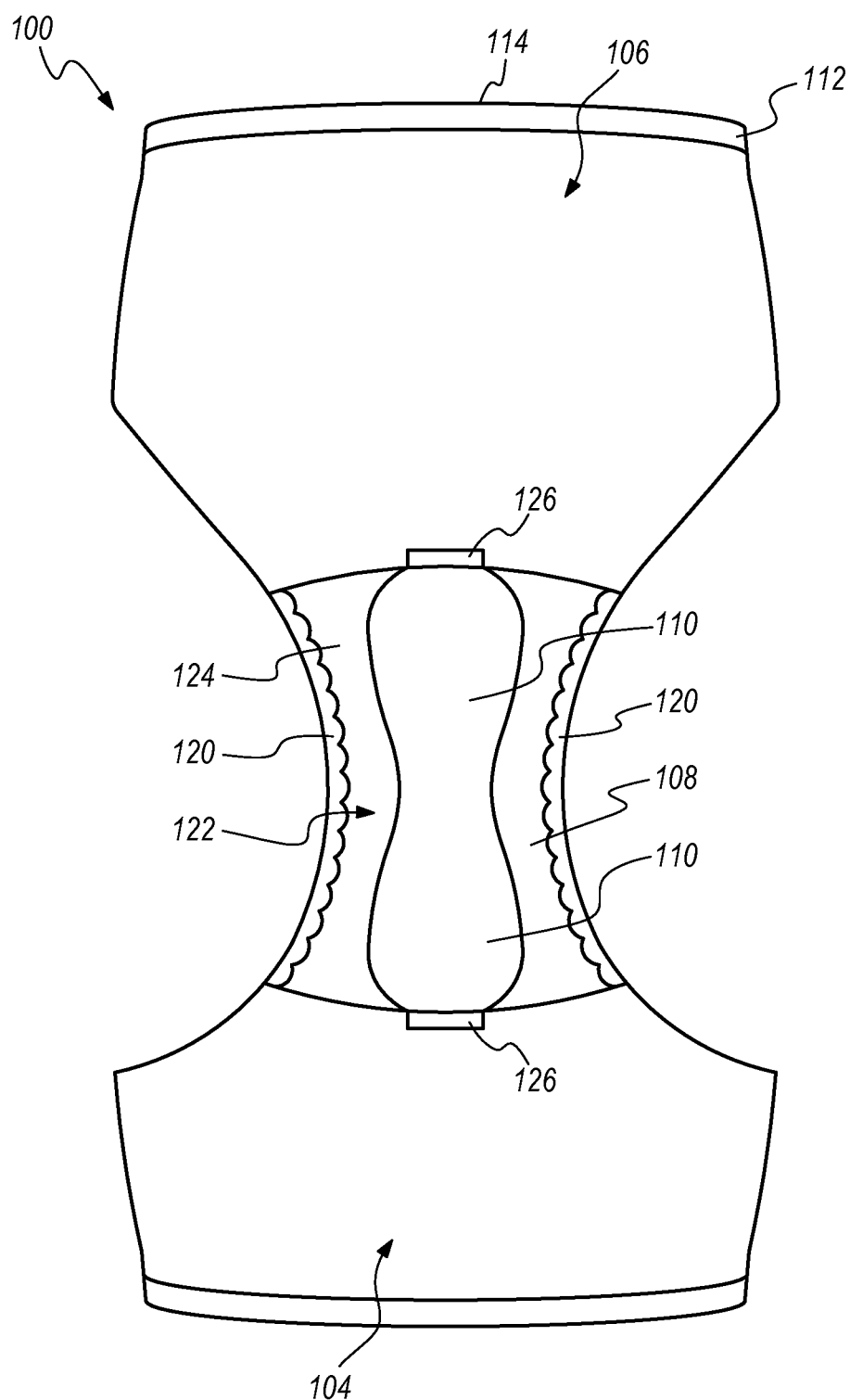
FIG. 2 is a plan view of an underwear style absorbent article in a flat condition.

As illustrated in FIGS. 1-2, a reusable underwear style absorbent article 100 comprises a chassis 102 having a front portion 104, a rear portion 106, a crotch portion 108 extending longitudinally between the front portion 104 and the rear portion 106 wherein at least a portion of the chassis 102 may receive removably attachable disposable liners 110 to absorb bodily discharges. It will be noted that the underwear described herein may be made of typical underwear material found in the art. For example, the material may be polyester, cotton, nylon, lace, mesh, spandex, bamboo, etc. This material may be breathable or non-breathable material. Further, the material may have anti-microbial properties to increase hygiene, prevent infection, or prevent bacteria that causes odor, thereby extending the use of the underwear style absorbent article 100. Such anti-microbial properties may be achieved by the use of certain elements or compounds in the material itself or may be achieved by treatment or coating of the underwear material by an antimicrobial compound. Examples of anti-microbial materials that may be used include but are not limited to zinc, silver, iodine, chlorhexidine, polyhexamethylene biguanide, or bamboo. It will be understood that bamboo can act as a protective underwear material as well as an anti-microbial material due to a bio-agent referred to as "bamboo kun." In addition or alternatively, the underwear material may be imbued or treated with compounds that improve cleaning, reduce staining or provide other hygienic benefits.

Additionally, in some embodiments, the material may be hypoallergenic. By utilizing material that is reusable or launderable, the underwear style absorbent article can be of higher quality and can fit a user better, as compared to a typical disposable absorbent article.

In some embodiments, the underwear style absorbent article 100 may comprise a material that is non-extensible from the front to rear portions 104, 106. Such non-extensible material is used to prevent sagging when the underwear style absorbent article 100 is inundated with bodily fluid. To further assist the non-extensible material, material reinforcements may be placed from the front portion 104 to the rear portion 106. Additionally, in some embodiments, heavy stitching may be used to reinforce the underwear style absorbent article 100.

Whereas a diaper style absorbent article would comprise side panels joined by complementary fasteners, embodiments comprising underwear style absorbent article 100 securement may include an elastic band 112 that extends along a top edge 114 of a waist opening 116 of the underwear style absorbent article 100. The elastic band 112 in conjunction with leg openings 118 secures the underwear style absorbent article 100 on a user. In alternate embodiments, the underwear style absorbent article 100 may comprise left front and rear side panels and right front and rear side panels that may be welded, bonded, or adhered together with a seam that may face toward or away from a user. Extending laterally from the front and rear portions left and right sides are left side panels and right side panels. These panels may be formed separately and joined by a seam or integrally formed. Additionally, the panels may be separately formed and attached to the front and rear portions of the chassis, or they may be integrally formed with one or more layers of the front and rear portions.

Referring to FIG. 2, the crotch portion 108 of the underwear style absorbent article 100 may comprise a set of leak guards 120. The leak guards 120 may be sewn into the crotch portion. However, the leak guards 120 are not limited to being sewn into the crotch portion 108 and may be, for example, welded, glued, etc. The leak guards 120 may be sewn in a way so that they may be moved/lifted to an erected position. In some embodiments, the leak guards are coupled to the removably attachable disposable liner.

Extending between the leak guards 120 is a liner receiving portion 122, which may comprise a moisture-impervious lining 124. Accordingly, the moisture-impervious lining 124 may be made of any material that is suitable to prevent, or minimize, body fluids from escaping the underwear style absorbent article 100. Some examples of moisture-impervious linings may include polyethylene and/or breathable poly. In certain embodiments, the moisture impervious lining is a thin film. It will be appreciated that the moisture-impervious lining may be, for example, sewn, welded, or glued to the liner receiving portion 122.

The liner receiving portion 122 may further comprise a liner attachment 126, which may include, but is not limited to, hook and loop, snap fasteners, press seal, or magnets. The liner attachment 126 may be placed in at least two locations. However, some embodiments may include a plurality of liner attachments coupled to the liner receiving portion so that the removably attachable liner may be adjusted to fit a user. Accordingly, when the leak guards 120 are moved into an erected position the removably attachable disposable liner 110 may be placed between the leak guards 120 in the liner receiving portion 122 and secured thereto via the liner attachment 126.

Figure 3:
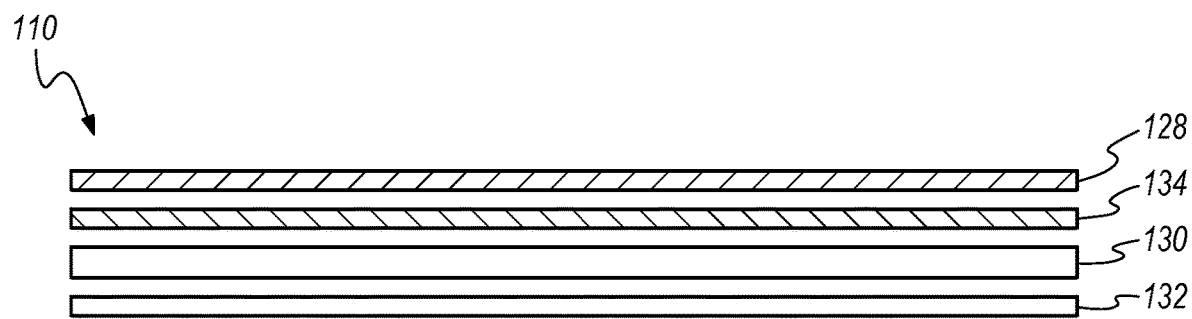
FIG. 3 is an exploded, cross-section view of a removably attachable liner of an underwear style absorbent article.

As illustrated in FIG. 3, the removably attachable disposable liner 110 may comprise a moisture-pervious inner layer 128, an absorbent layer 130, and a moisture-impervious outer layer 132. In some embodiments, an acquisition/distribution layer 134 may be positioned between the moisture-pervious inner layer 128 and the absorbent layer 130 to quickly distribute bodily fluids across the absorbent layer 130. The inner layer 128 may be composed of a fabric suitable to allow body discharges to pass through the inner layer 128 and be absorbed by the absorbent and/or distribution layer 134. Non-limiting examples of materials suitable to form the inner layer 128 include polypropylene, polyethylene, polyester, materials having hydrophilic properties, combinations thereof and/or the like. Additionally, the inner layer 128 can be treated with a hydrophilic finish to improve passage of fluids through to layers beneath the inner layer 128. Non-limiting examples of suitable hydrophilic finishes include stearic acid, melamine-based chemicals, fluorocarbon chemicals, and silicon based chemicals.

Figure 4:
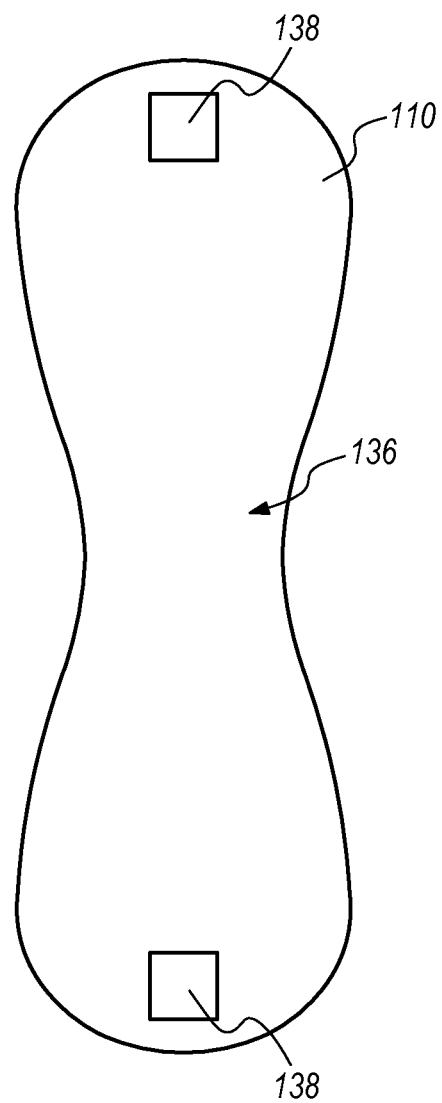
FIG. 4 is a bottom plan view of a removably attachable disposable liner of an underwear style absorbent article.

As illustrated in FIG. 4, on an outer surface 136 of the removably attachable disposable liner 110, there may be an attachment 138 that mirrors the attachment 126 found on the liner receiving portion 122. While a single size of the removably attachable disposable liner is illustrated 110, other sizes of removably attachable disposable liners may be utilized. In fact, employing a variety of sizes of the removably attachable disposable liners 110 would be beneficial to a user. More specifically, the size of a removably attachable disposable liner 110 may change because of the circumstances of the user. For example, a smaller liner may be installed for daytime use while a larger liner (e.g., long, thick liner) that can last the duration of the night and prevent bodily fluids from escaping may be installed for overnight use. Alternatively, the user may also move the removably attachable disposable liner 110 into a more forward or rearward position depending on the activity. For example, the user may place a removably attachable disposable liner 110 in a more forward position when standing. In contrast, when the user will be sitting for an extended period of time, the user may place the removably attachable disposable liner 110 in a more rearward position. Further, while the removably attachable disposable liner 110 is shown in an hourglass shape, it will be appreciated that the liner 110 may be any other shape, such as rectangular.

In use, a user enters the underwear style absorbent article 100 using the same techniques used to don traditional undergarments. To remove the underwear style absorbent article 100, shoes are removed, clothing is lowered from about the waist and completely removed from about the ankles and feet, followed by lowering and removing the underwear style absorbent article 100 in the same manner as traditional undergarments. Optionally, instead of lowering and removing the underwear style absorbent article 100, a wearer or caregiver can lower the underwear style absorbent article 100 to the knees of the wearer, grasping and removing the removably attachable disposable liner 110. The wearer or caregiver may then place an unused disposable liner 110 into the liner receiving portion 122. If the underwear style absorbent article 100 becomes unclean due to continued use or bodily fluid leaking thereon, the wearer or caregiver may remove the underwear style absorbent article 100, as discussed above, to be laundered. It will be appreciated that the wearer may not only save money reusing the underwear style absorbent article 100 but may also have a system that may be adapted to the wearer's specific needs.

Figure 5:
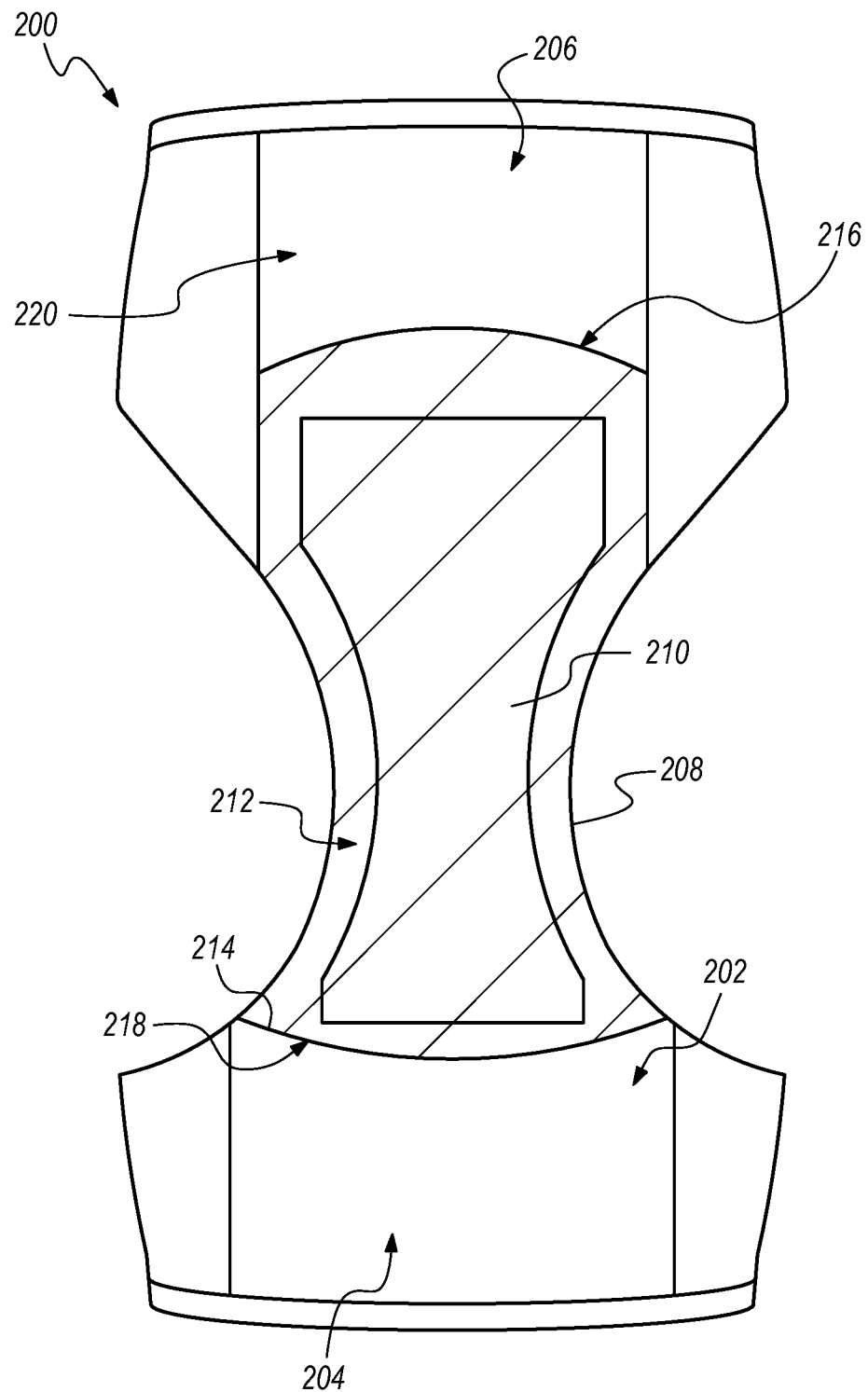
FIG. 5 is a top plan view of an embodiment of an underwear style absorbent article in a flat condition.

FIG. 5 illustrates an embodiment of a reusable underwear style absorbent article 200, including a chassis 202 having a front portion 204, a rear portion 206, a crotch portion 208 extending longitudinally between the front portion 204 and the rear portion 206 wherein at least a portion of the chassis 202 receives removably attachable disposable liners 210. The underwear style absorbent article 200 may be placed on a user in a similar manner as the embodiment described above. The crotch portion may comprise a liner receiving portion 212, which allows the removably attachable liner 210 to be easily attached and detached.

The liner receiving portion 212 may comprise a compartment 214 extending longitudinally between the front and rear portions 204, 206. The compartment 214 may have an aperture 216 at a first end or an aperture 218 at a second end or, alternatively, first and second apertures 216, 218 for receiving a removably attachable disposable liner 210 thereunder. It will be appreciated that the first and second apertures 216, 218 allow a user to insert or remove the liner 210 from two separate locations, creating ease of insertion and removal for the user. In some embodiments, the compartment 214 may be pouch-like by having a single aperture, thereby creating one location to remove or insert the disposable liners. Further, in certain embodiments, the compartment 214 may be long or, in other words, extend along the entire length longitudinally between the front and rear portions. While in other embodiments, there may be a short compartment extending between the front and rear portions 204, 206. It will be appreciated that the liner receiving portion 212 may comprise a moisture-impervious layer 220 to prevent bodily fluids from escaping the underwear style absorbent article 200.

Additionally, the compartment 214, in other embodiments, may comprise an attachment mechanism at the first and second apertures 216, 218 so as to secure the removably attachable disposable liner 210 in a non-movable position. The attachment mechanism may be hook and loop, snap fasteners, or an elastic band. For example, when the elastic band is utilized, the removably attachable disposable liner 210 is positioned underneath the compartment, stretching the elastic bands, which places tension on the liner 210.

Further, the compartment 214 may be an acquisition and/or distribution layer or any other moisture-pervious layer. The liquid acquisition and/or distribution layer serves to rapidly acquire and then distribute acquired liquid to the removably attachable liner 210 for retention. To achieve rapid acquisition and distribution, these layers often include cellulosic fibers. These layers can include cross-linked cellulosic fibers to impart bulk and resilience to the layer, and wood pulp fibers to increase the wicking of liquid within the layer and to facilitate distribution of the liquid throughout the layer and ultimately to another layer, such as an absorbent layer. It will be appreciated that embodiments of the compartment 214 absorbs little to no fluid as compared to the absorbent layer. In some embodiments, the compartment 214 may be treated with compounds to prevent odor retention.

Figure 6:
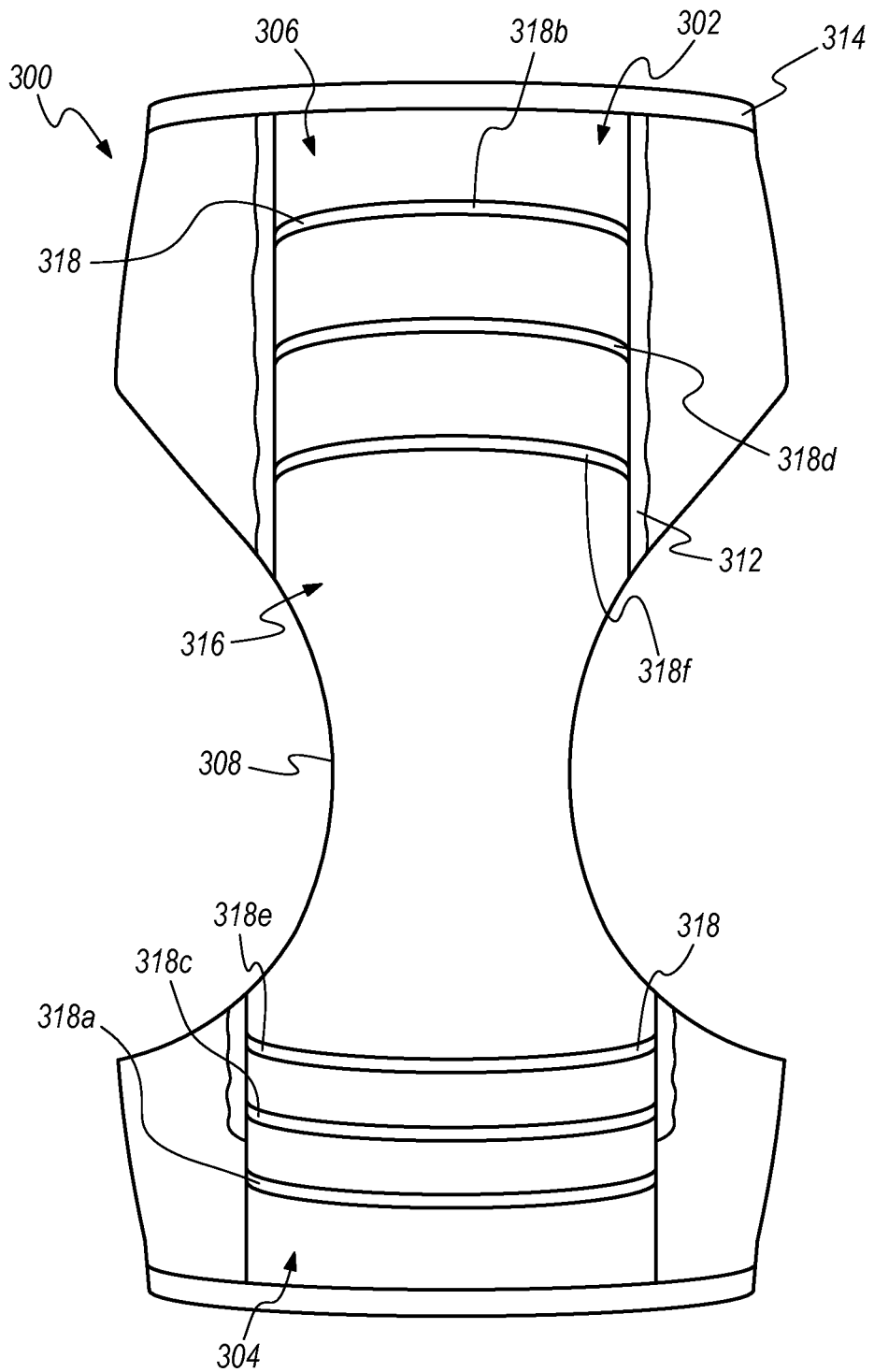
FIG. 6 is a top plan view of an embodiment of an underwear style absorbent article in a flat condition.
Figure 7:
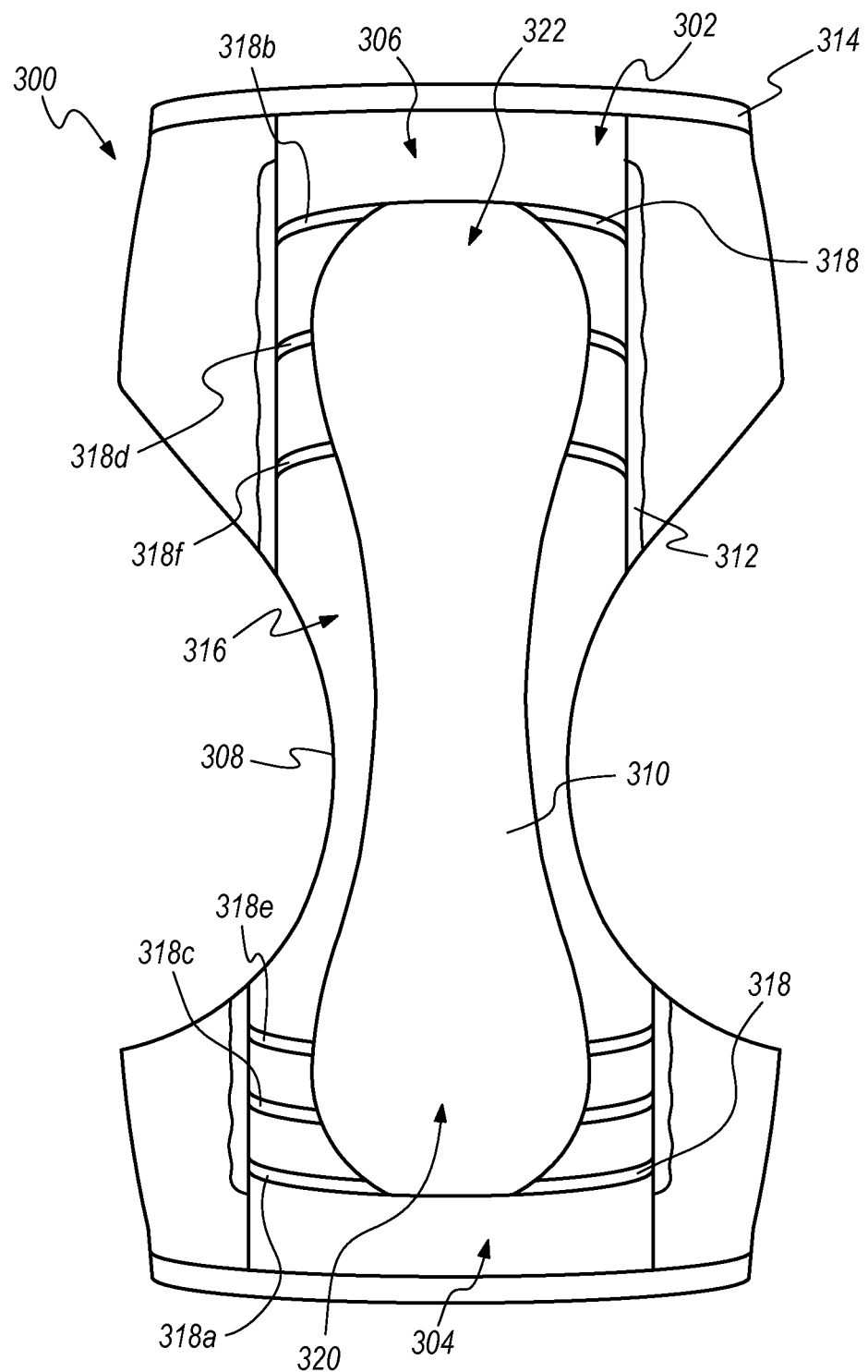
FIG. 7 is a top plan view of the absorbent article of FIG. 6 after inserting a removably attachable disposable liner.

FIGS. 6-7 illustrate an embodiment of the reusable underwear style absorbent article 300, including a chassis 302 having a front portion 304, a rear portion 306, a crotch portion 308 extending longitudinally between the front portion 304 and the rear portion 306 wherein at least a portion of the chassis 302 receives removably attachable disposable liners 310. The underwear style absorbent article 300 may further comprise a set of leak guards 312. In some embodiments, the leak guards 312 may be attached to the removable attachable disposable liner.

The reusable underwear style absorbent article 300 may comprise an elastic waistband 314 that may be stretched over the user's hips so as to be adjustable and to secure the article 300 to the user. The crotch portion 308 comprises a liner receiving portion 316, which includes a liner attachment that comprises one or more slits 318 that receive and end portion 322 of the removably attachable disposable liner 310. The slits 318 may be located on the liner receiving portion 316 at the front portion 304 and the liner receiving portion at the rear portion 306. The slits 318 may be formed by folding material so as to create a pouch where a portion of the removably attachable disposable liner 310 may be inserted. In other words, a first end 320 of a removably attachable disposable liner 310 may be positioned inside, for example, a slit 318a on the liner receiving portion 316 at the front portion 304. A second end 322 may then be positioned inside a slit 318b on the liner receiving portion 316 at the rear portion 306.

Referring to FIG. 6, it will be appreciated that the underwear style absorbent article 300 with slits 318 may comprise a plurality of slits 318a-f so that a variety of lengths of removably attachable disposable liners 310 may be used and/or positioned at a variety of locations. It will further be appreciated that a liner 310 may be adjusted along the crotch portion 308, from the front portion 304 to the rear portion 306, depending on the length of the liner and the slits used. For example, slits 318a and 318b may be used for a relatively longer liner, while slits 318e and 318f are used for a shorter liner. Alternatively, slits 318a and 318f may be used to position the liner more toward the front portion 304 of the article, while slits 318e and 318b may be used to position the liner more toward the rear portion 306 of the article. The slits 318, in some embodiments, may be color coded to distinguish the slits when placing the liner therein.

Figure 8:
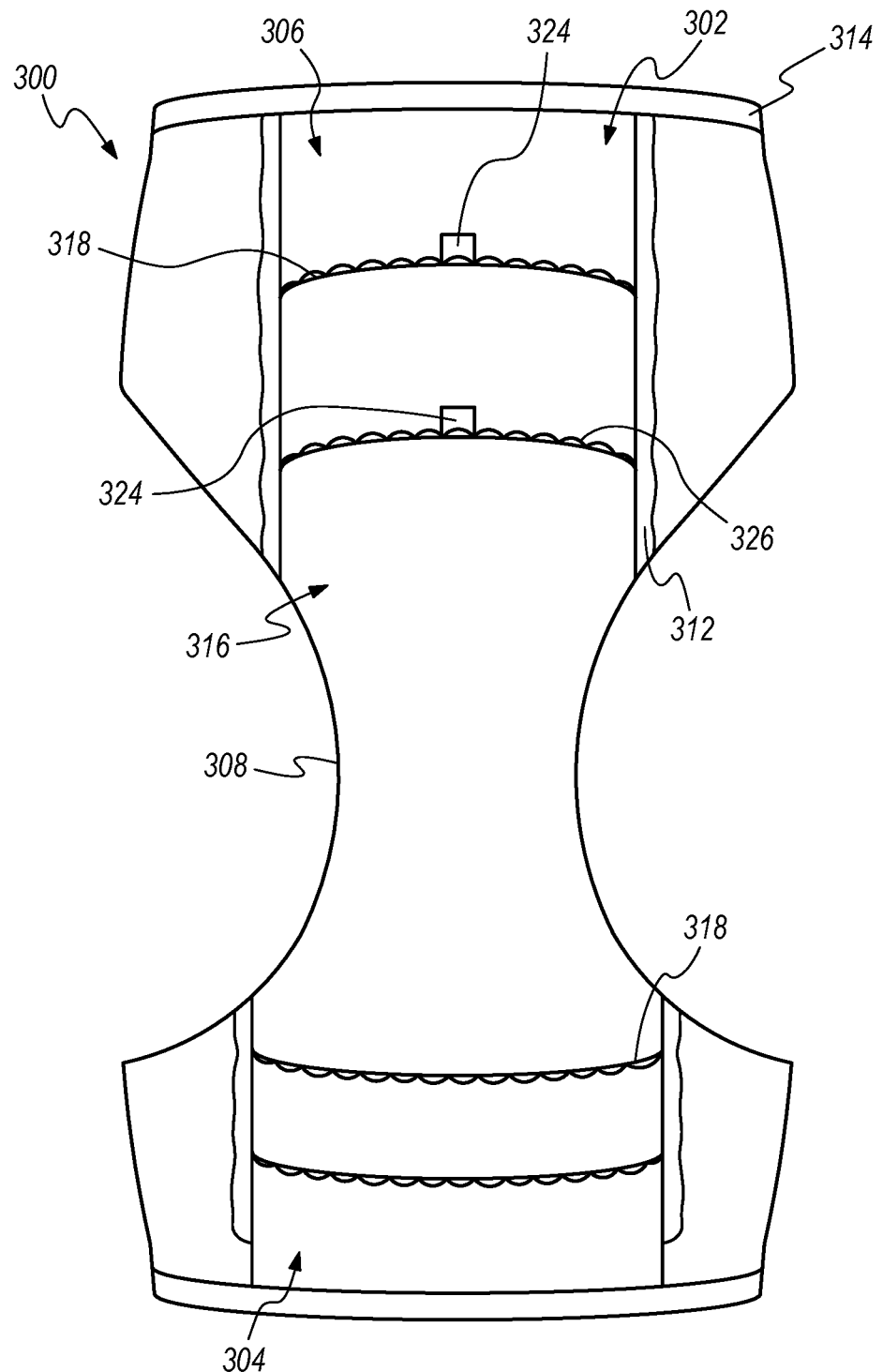
FIG. 8 is a top plan view of an underwear style absorbent article in a flat condition.

In some embodiments, as shown in FIG. 8, the slits 318 may comprise elastic properties. For example, the slits 318 may comprise an elastic band, leading a user to stretch the slit to an open position to insert the removably attachable disposable liner 310. Alternatively, the slits 318 may be made from an extensible material. The tension placed on the removably attachable disposable liner 310 via the elastic bands or extensible material may decrease the lateral or longitudinal movement of the liner 310, creating comfort and security while wearing the underwear style absorbent article 300. Alternatively, slits 318 may not comprise a cut or through aperture in the receiving portion 316, but rather, the slits may comprise an elastic or other strip of material extending across the liner 310, thereby creating a slit into which an end portion 320, 322 of the liner 310 is positioned.

To aid the wearer or a caregiver in opening the slits 318, tabs 324 may be coupled to the slits 318. In particular, the tabs 324 may extend from, and be coupled to, an edge 326 of the slits 318, whether on the slits 318 near the front portion 304 or rear portion 306. The tabs 324 may be made from the same material that is used for inner layers of the removably attachable disposable liner 310, such as, for example, polyethylene and/or breathable poly. The tabs 324 can also be a polyethylene film or any soft, pliable material that can be used and laundered repeatedly. It will also be appreciated that the tabs 324 may be of any adequate material known in the prior art. The tabs 324 may be in similar locations, in line, as shown in FIG. 6. Alternatively, the tabs 324 may be placed at a distance away from each other (i.e., not in line). This can help prevent the wearer from trying to remove the wrong layer.

The tabs 324 may also be color coded, such as red and green, to assist the wearer in placing the liner 310 into the correct slit. Not only can color and distance of the tabs 324 vary, but the size and shape may also vary. The tabs 324 have a generally square shape. However, the tabs 324 may also be circular, triangular, or any other non-limiting example. The tabs 324 may also be narrower or wider than depicted in FIG. 6. To use the tabs 324, a user may grasp the tabs 324 and lift to open the slit 318 and insert the removably attachable disposable liner 310. While tabs 324 are only illustrated in FIG. 6, it will be appreciated that any embodiments described herein may comprise tabs 324 to assist a user when inserting the removably attachable disposable liner.

Figure 9:
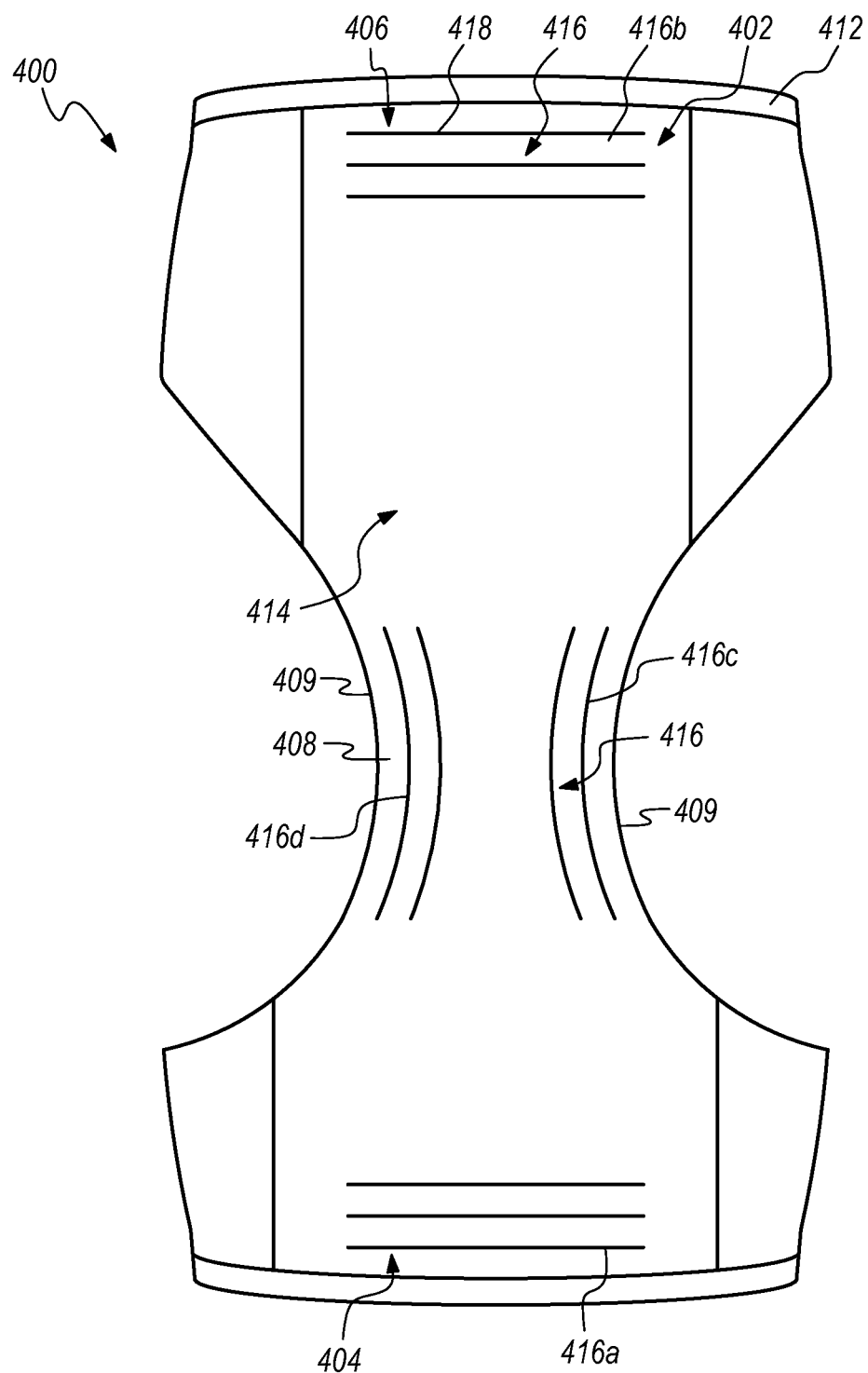
FIG. 9 is a top plan view of an embodiment of an underwear style absorbent article in a flat condition.

FIG. 9 illustrates an embodiment of the reusable underwear style absorbent article 400, including a chassis 402 having a front portion 404, a rear portion 406, a crotch portion 408 extending longitudinally between the front portion 404 and the rear portion 406 wherein at least a portion of the chassis 402 receives removably attachable disposable liners 410. The reusable underwear style absorbent article 400 may comprise an elastic waistband 412 that may be stretched over the user's hips so as to be adjustable and to secure the article 400 to the user. The crotch portion 408 comprises a liner receiving portion 414, wherein the liner receiving portion 414 comprises a plurality of chassis mating grips 416. As illustrated in FIG. 9, the plurality of chassis grips 416 may be lines of grip material 418 located in a variety of positions on the liner receiving portion 414. Alternatively, the chassis mating grips may comprise spaced apart dots, circles, angled linear elements, or any other appropriate pattern as would be understood by one of ordinary skill in the art. The plurality of mating grips 416 may be silicone. In some embodiments, other mating mechanisms may be used, such as hook and loop, adhesives, etc. Chassis mating grips 416a, 416b may be positioned and front 404 and rear 406 portions of the chassis. Chassis grips 416a, 416b may extend parallel to the waist band 412. Alternatively or in addition, chassis grips 416c, 416d may be placed at or adjacent to leg opening portions 409 of the crotch portion 408.

Figure 10:
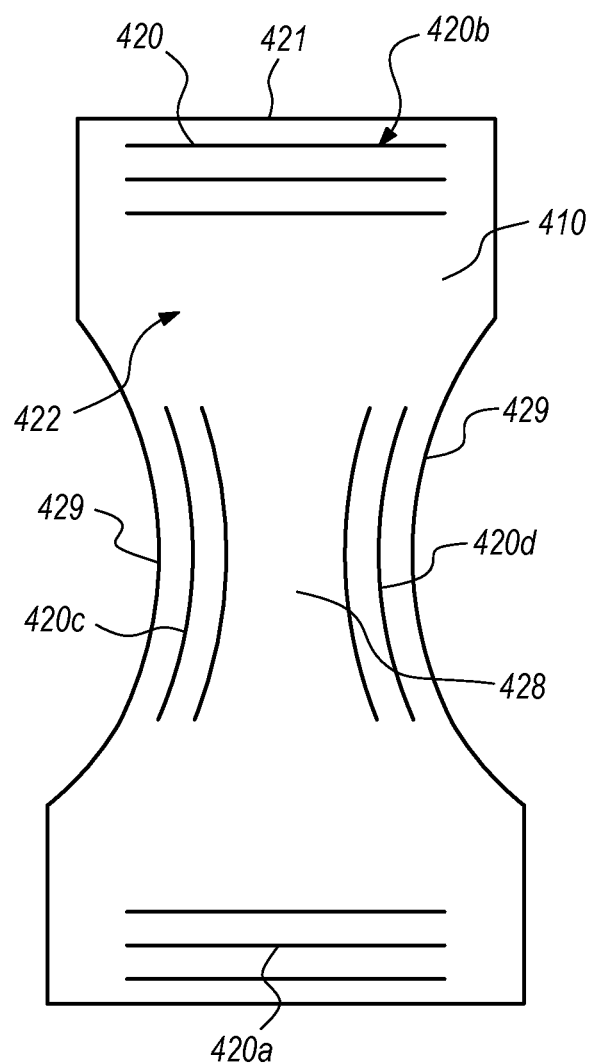
FIG. 10 is a bottom plan view of a removably attachable disposable liner of an underwear style absorbent article with line grippers.
Figure 11:
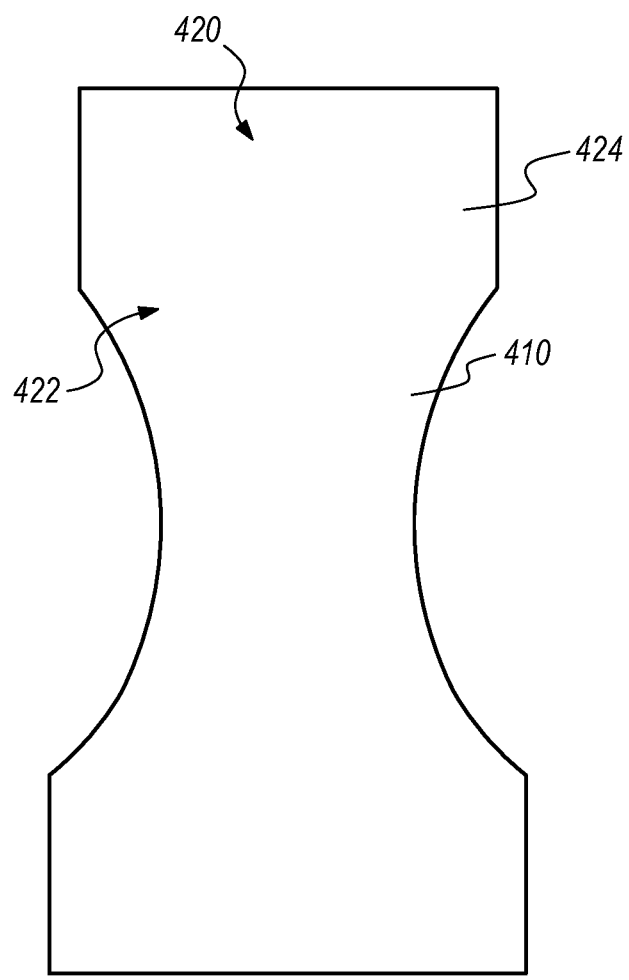
FIG. 11 is a bottom plan view of a removably attachable disposable liner of an underwear style absorbent article with dot grippers.

As shown in FIG. 10, the removably attachable disposable liner 410 may comprise a plurality of liner mating grips 420 on a bottom surface 422. Liner grips 420a, 420b may extend parallel to an end 421 of the liner. Alternatively or in addition, liner grips 420c, 420d may be placed at or adjacent to leg opening portions 429 of a crotch portion 428 of the liner 410. These liner grips 420 may be positioned on the liner such that each liner grip engages with a corresponding chassis grip. For example front liner grip 420a may engage with front chassis grip 416a, rear liner grip 420b may engage with rear chassis grip 416b, and side liner grips 420c, 420d may engage with side chassis grips 416c, 416d. Alternatively, as shown in FIG. 11, the plurality of liner mating grips 420 may be numerous silicone dots 424 to ensure a non-slip surface not only with the chassis mating grips 416, but with the non-grip areas of the liner receiving portion 414. When the plurality of liner mating grips 420 contact the plurality of mating grips 416, a non-slip surface is created.

Active adults may struggle and become frustrated with liners in the prior art that are not attached or have a poor mating connection, which may cause constant shifting of the liner. Such shifting may force the wearer to find a private location to rearrange the liner. In contrast, the plurality of mating grips 416 are used to prevent the removably attachable disposable liner 410 from shifting while the wearer is conducting everyday activities. After bodily fluids have contacted the removably attachable disposable liner 410, the wearer or a caregiver may lower the undergarments to the knees and simply remove the liner 410 and place a new liner 410 with the plurality of liner mating grips 420 directly on the plurality of mating grips 416.

Figure 12:
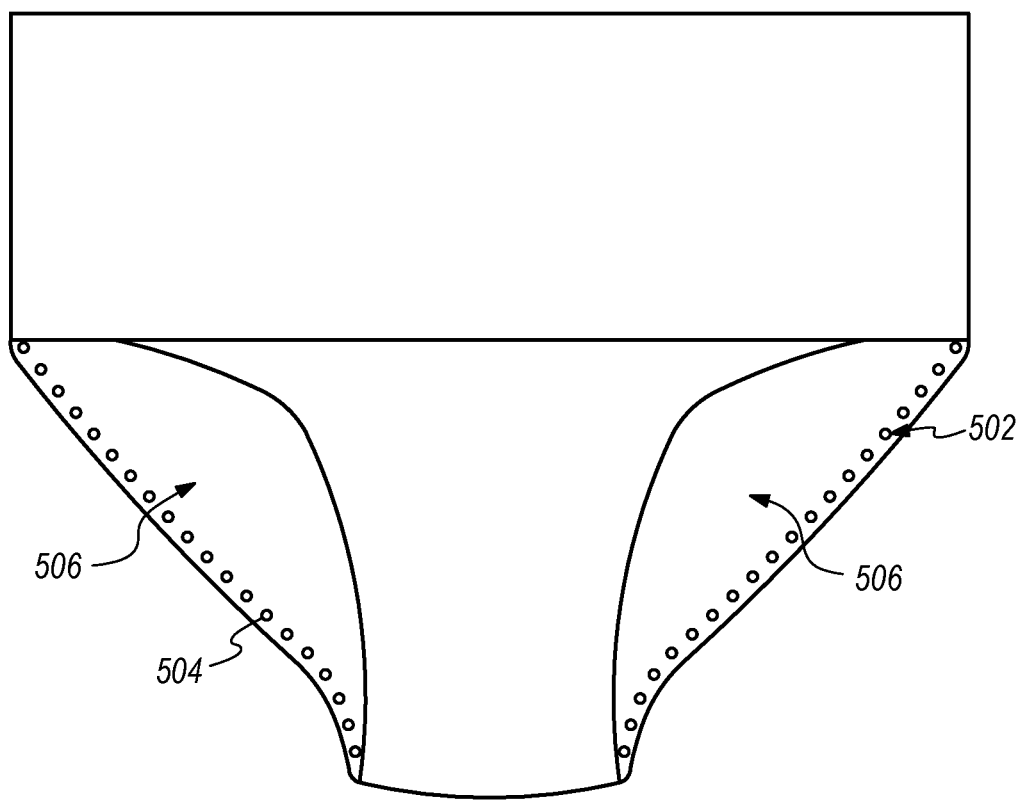
FIG. 12 is a front elevation view of an underwear style absorbent article with silicone dots around a first and a second leg opening.
Figure 13:
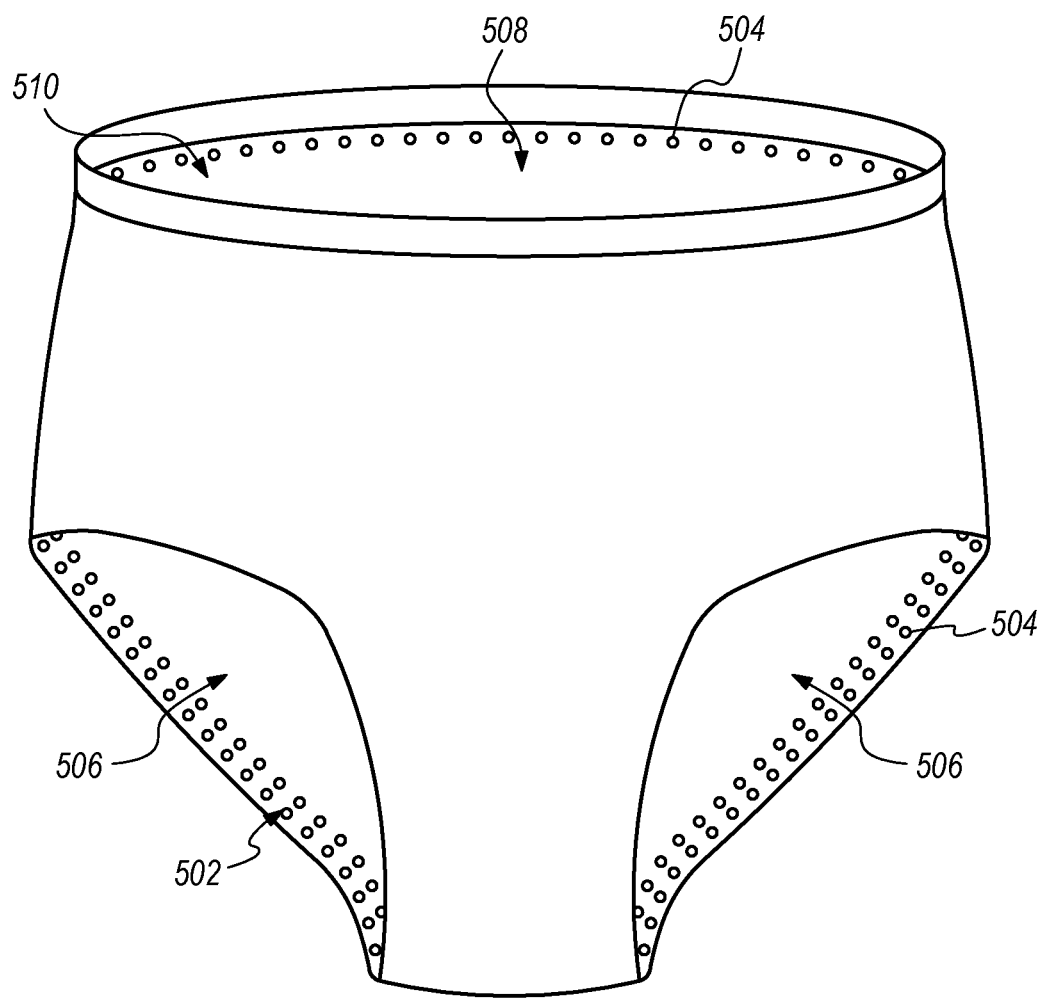
FIG. 13 is a front, top perspective view of an underwear style absorbent article with silicone dots around a waist opening and a first and a second leg opening.
Figure 14:
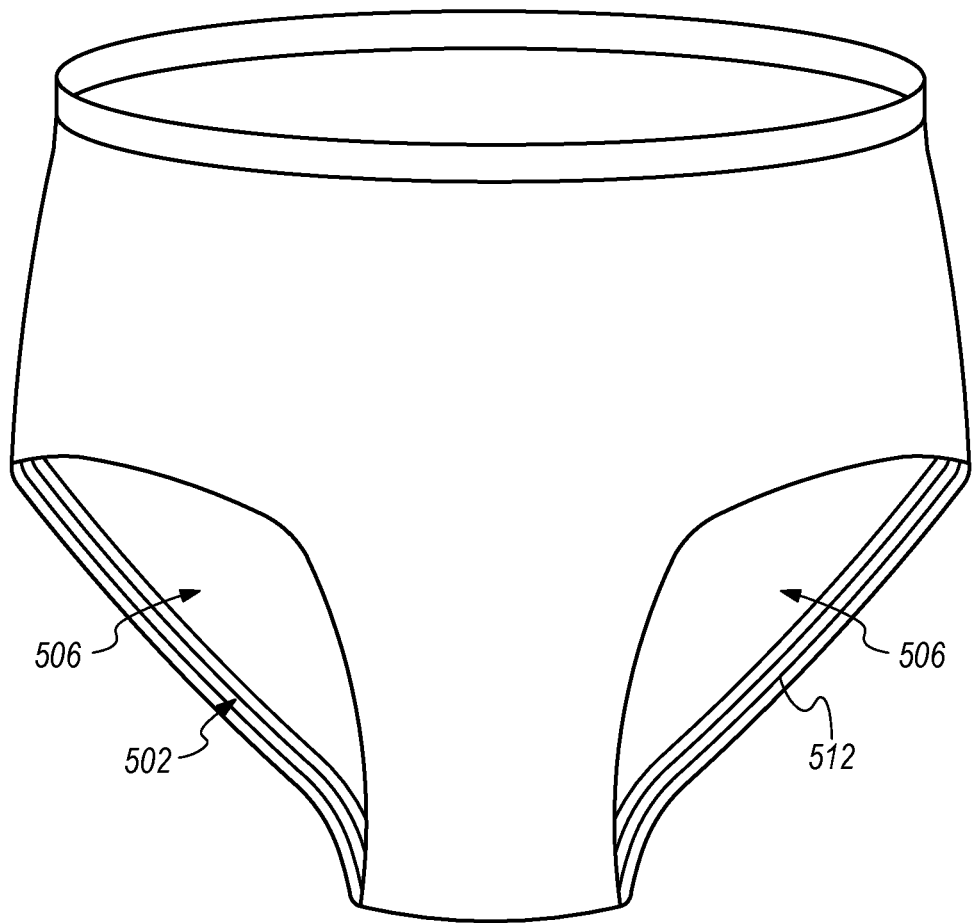
FIG. 14 is a front, top perspective view of an underwear style absorbent article with silicone lines around a first and a second leg opening.

In accordance with the various embodiments, the underwear style absorbent article 100, 200, 300, 400 may further comprise non-slip textures 502 as shown in FIG. 12. More specifically, in some embodiments, the non-slip textures may be silicone grippers 504 that are attached around a leg openings 506, which could lead to a better fit around the legs. In other embodiments, as shown in FIG. 13, the silicone grippers 504 may be attached around the leg openings 506 as well as attached on an inside surface surrounding 508 a waist opening 510, such as integrated into the elastic waist band. The silicone grippers 504 may be applied to the underwear style absorbent articles, herein described, in a dot pattern. Further, it will be appreciated that the silicone grippers 504 may be applied in any pattern, such as lines 512. Accordingly, in other further embodiments shown in FIG. 14, the silicone grippers 504 may be attached around the leg openings 506 in the line pattern 512. In one embodiment, the silicone grippers could be in a pattern of small dots of silicone along the edge of the leg openings with the dots being about 0.1 inch in diameter and the total width of the pattern approximately 0.5" wide. Often, typical underwear does not fit properly and may tend to shift on a user. The silicone grippers could improve backside coverage and could help keep the article in place.

In accordance with the various embodiments, the underwear style absorbent article may include aesthetically pleasing color features so as to suggest that the article resembles the color features of traditional undergarments. Additionally, the underwear style absorbent article may be made of traditional undergarment material with the capabilities of receiving the removably attachable disposable liner, similar to those discussed above. By way of non-limiting example, the article may be buff colored, gray, purple, pink, or black, or include a multi-colored pattern, designs, or indicia. Further, the article may include embroidered patterns or lace.

While an underwear style absorbent article is depicted, those skilled in the art will recognize that bikini, boxer, boxer brief, and other styles of absorbent articles (for example, diapers and training pants) can be implemented without departing from the scope of the embodiments disclosed herein.

While the present invention has been described with reference to one or more particular embodiments, those skilled in the art will recognize that many changes may be made thereto without departing from the spirit and scope of the present invention. Furthermore, components from one embodiment can be used in other non-exclusive embodiments. By way of example, any of the features of FIGS. 1-4 described herein can include any of the features described in FIGS. 5-14. Additionally, any of the features of FIGS. 5-14 described herein can include any of the features described in FIGS. 1-4. Each of these embodiments and obvious variants thereof is contemplated as falling within the spirit and scope of the invention, which is set forth in the alternative embodiments.

What is claimed is:

1. An absorbent article chassis for receiving a removable, disposable absorbent liner, the absorbent liner comprising a plurality of silicone liner mating grips on a surface of the absorbent liner, and the chassis comprising:
   a front portion;
   a rear portion;
   a crotch portion extending between the front portion and the rear portion;
   a liner receiving portion comprising a plurality of silicone chassis mating grips on a surface of the liner receiving portion;
   a first liner attachment spaced a distance from a front edge of the liner receiving portion;
   a second liner attachment spaced a farther distance from the front edge of the liner receiving portion;
   a third liner attachment spaced a distance from a rear edge of the liner receiving portion; and
   a fourth liner attachment spaced a farther distance from the rear edge of the liner receiving portion;
   wherein the chassis receives an absorbent liner in a forward position by attaching a front end of the liner to the first liner attachment and attaching a rear end of the absorbent liner to the fourth liner attachment;
   wherein the chassis alternatively receives the absorbent liner in a rearward position by attaching a front end of the liner to the second liner attachment and attaching a rear end of the absorbent liner to the third liner attachment; and
   wherein one or more of the liner mating grips engages with one or more of the chassis mating grips when the chassis receives the absorbent liner.

2. The absorbent article chassis of claim 1 wherein each liner attachment comprises a slit formed in liner receiving portion.

3. The absorbent article chassis of claim 2 wherein each slit comprises folded material that creates a pouch were an end of an absorbent liner may be inserted.

4. The absorbent article chassis of claim 2 wherein the slits are visually distinguished by color coding.

5. The absorbent article chassis of claim 1 wherein each liner attachment comprises a hook and loop fastener.

6. The absorbent article chassis of claim 1 wherein each liner attachment comprises a length of elastic material that extends at least partially across the liner receiving portion.

7. The absorbent article chassis of claim 6 wherein the chassis receives an absorbent liner by inserting an end of the absorbent liner under the length of elastic material.

8. The absorbent article chassis of claim 1 wherein the plurality of silicone chassis mating grips comprises a first plurality of chassis matting grips in a first position and a second plurality of chassis mating grips in a second position.

9. The absorbent article chassis of claim 8 wherein one or more of the liner mating grips engages with one or more of the first plurality of chassis mating grips when the chassis receives the absorbent liner in the forward position.

10. The absorbent article chassis of claim 9 wherein the plurality of liner mating grips does not engage with the second plurality of chassis mating grips when the chassis receives the absorbent liner in the forward position.

11. The absorbent article chassis of claim 8 wherein one or more of the liner mating grips engages with one or more of the second plurality of chassis mating grips when the chassis receives the absorbent liner in the rearward position.

12. The absorbent article chassis of claim 11 wherein the plurality of liner mating grips does not engage with the first plurality of chassis mating grips when the chassis receives the absorbent liner in the rearward position.

13. The absorbent article chassis of claim 1 wherein each of the plurality of silicone chassis mating grips comprises a line of silicone grip material.

14. The absorbent article chassis of claim 1 wherein the plurality of silicone chassis mating grips comprises a pattern of spaced apart dots of silicone grip material.

15. The absorbent article chassis of claim 1 wherein each of the plurality of silicone liner mating grips comprises a line of silicone grip material.

16. The absorbent article chassis of claim 15 wherein each line of grip material extends parallel to an end of the absorbent liner.

* * * * *